Feb. 8, 1949.  G. J. KOVACS  2,460,831
METHOD AND APPARATUS FOR MOLDING
Filed Oct. 23, 1944
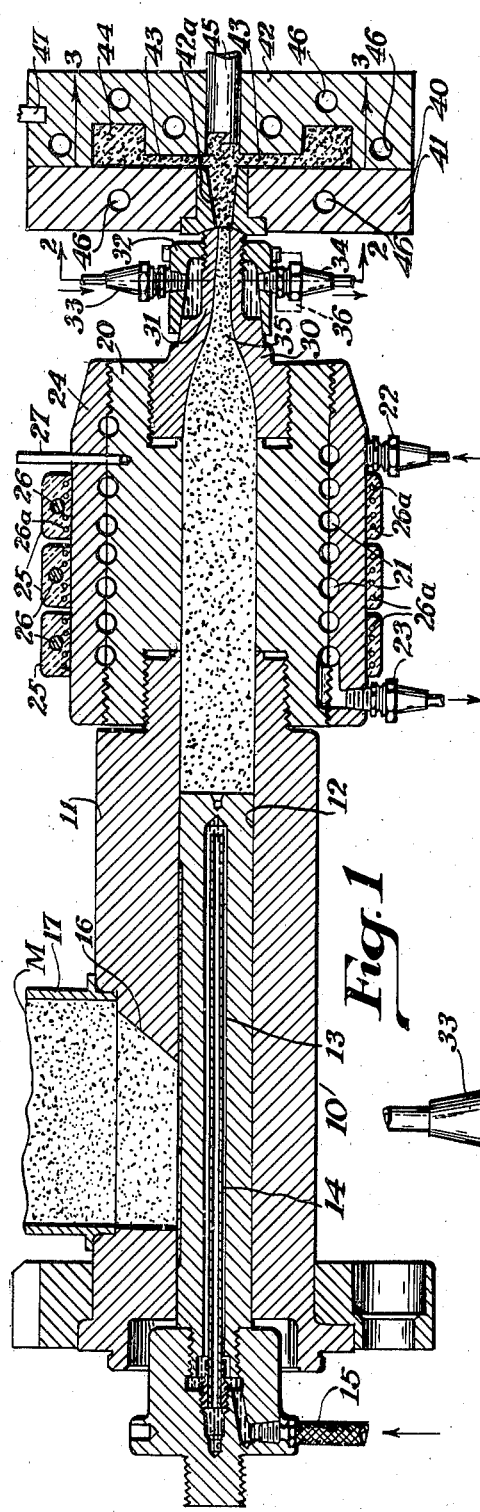
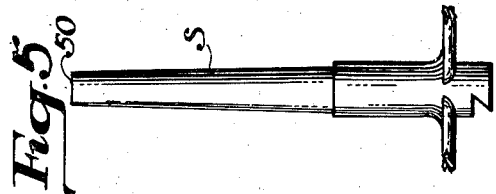
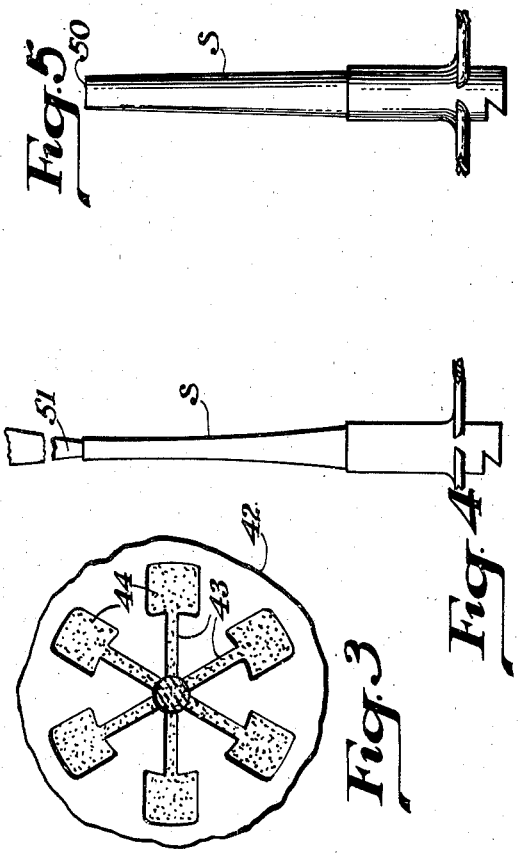
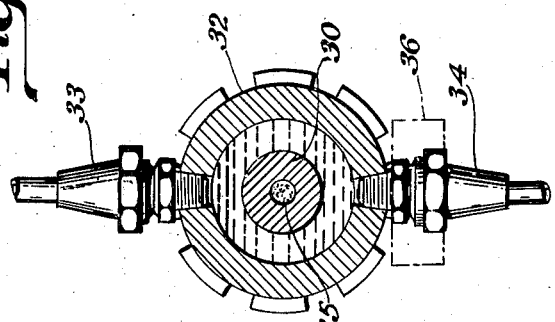
INVENTOR.
GEORGE J. KOVACS.
BY Fay, Golrick, Chilton & Isler.
Attorneys.

Patented Feb. 8, 1949

2,460,831

UNITED STATES PATENT OFFICE 2,460,831

METHOD AND APPARATUS FOR MOLDING

George J. Kovacs, Walled Lake, Mich.

Application October 23, 1944, Serial No. 559,979

5 Claims. (Cl. 18—30)

The present invention relates to molding thermo-setting materials, and more particularly to a method and apparatus for injection molding, which method consists, broadly, in injecting thermo-setting material or material amenable to such method into a mold through a restricted passage.

Heretofore, it has been the practice, in injection molding of thermo-setting material to heat the material to at least its plastic temperature in a plasticizing cylinder and then direct the material through a nozzle into the mold sprue by a piston. The material in the nozzle was heated either by specific heating devices and/or by the conduction of heat from the plasticizing cylinder and particularly heat from the mold to the nozzle. In practice, the temperature of the material in the nozzle would become such as to cause the material to polymerize or, to use an alternate expression, to "set up," i. e., to solidify, in the nozzle, and prior to each injection operation it would be necessary to purge the nozzle of this solidified material. Also, when the mold was opened and the sprue removed considerable material inside the nozzle would be set up integral with the sprue and would be pulled from inside the nozzle. Thus, the injection molding heretofore practiced was inefficient in the use of materials and with respect to the speed of production of molded parts. Also, in addition to the sources of heat just mentioned, the material, in being forced into the restricted passageway of the nozzle, would be heated by friction with the walls of the nozzle.

Another objection to injection molding was that the temperature of the material injected into the mold was so close to the setting temperature that the material in the nozzle, sprue and runners of the mold would set up or polymerize throughout its cross-sectional area prior to the polymerization of the material in the mo'd cavities so that, in many instances, additional material could not be fed to the mold to take up shrinkages in the mold and maintain pressure in the mold just prior to and during setting. This condition resulted in imperfect molded parts.

Another method of injection molding has been brought forth wherein it was proposed to raise the temperature of the nozzle considerably above the mold temperature just prior to and during the injection of the material through the nozzle and then cool the nozzle after the injection. In practice, however, the temperature of the nozzle cou'd not be reduced rapidly enough to prevent setting up of some material in the nozzle, and a wasteful purging operation was required before each injection. Also, since heat was applied to the material in the nozzle, material in the runners and sprue of the mold solidified before sufficient material and pressure had been applied to the cavities. This condition was further aggravated by the necessarily small orifice of the nozzle wherein setting up of material invariably occurred.

An object of my invention is to provide an apparatus and method of molding wherein the material, prior to passing into the mold, is constantly maintained below its setting temperature but at a temperature in which the material flows, thereby completely eliminating setting up of the material in the injecting apparatus.

Another object of my invention is to maintain such differences in temperature between the structure of the injection apparatus comprising the plasticizing cylinder and nozzle and the mold structure, including the sprue and runners of the mold, that setting up or polymerization of the material in the sprue and runners does not completely take place before the setting up of the material in the mo'd cavities whereby hydraulic transmission of the material through the sprue and runners is maintained until the material in the mold cavities has set.

In carrying out my invention, I propose to dissipate heat conducted to the nozzle from the plasticizing cylinder and particularly the mold so that the temperature of the material in the nozzle throughout the length of the latter is at all times maintained below the setting temperature.

I further contemplate contro'ling the temperature of the material in the nozzle, including the material entering the nozzle passageway, so that the thermo-setting material is maintained in a plastic stage, but always at a temperature below the setting or molding temperature.

Other objects and advantages of my invention will be apparent from the following description of a preferred form of embodiment of the invention, reference being had to the accompanying drawings wherein:

Fig. 1 is a longitudinal sectional view of an injection molding apparatus embodying my invention;

Fig. 2 is a view in section taken on line 2—2 of Fig. 1;

Fig. 3 is a view of a mold taken on line 3—3 of Fig. 1;

Fig. 4 is a view in elevation of a sprue from the mold of an apparatus using one of the prior art methods of injection molding; and Fig. 5 is a view in elevation of a sprue taken from the mold of an apparatus employing the principle of the present invention.

Referring to the drawings, I have shown a molding apparatus indicated generally at 10, together with a mold cavity, for molding thermo-setting material by the injection method of molding. It is to be understood that the apparatus shown is a preferred form of the invention and that other forms of apparatus may be devised employing the same principle as contemplated by my invention, all of which fall within the scope of my invention as defined by the appended claims. The apparatus 10 comprises, in general, a heating or plasticizing chamber, wherein the thermo-setting material is preheated to a temperature which renders it plastic but without causing polymerization thereof. In general, depending on the material used, this plasticizing cylinder is maintained at approximately 190° F. A nozzle or orifice, as in conventional practice, is associated with the plasticizing cylinder and interconnects the interior of the cylinder with the sprue of the mold by contact with the sprue bushing of the mold structure. This nozzle is distinguished from conventional injection and similar type nozzles by being provided with an efficient, integral cooling device, and, preferably, there is provided a thermostatic control device for maintaining the temperature of the nozzle within an optimum range for maintaining the thermo-setting material plastic. Thus, I provide means for effectively dissipating heat conducted to the nozzle from the mold, which is maintained at a much higher temperature than the nozzle and plasticizing chamber, and to also carry away heat generated by internal friction and friction by sliding contact of the thermo-setting material as the thermo-setting material is forced from the plasticizing chamber into and through the nozzle, thereby preventing the temperature of the nozzle and the plasticizing cylinder from rising to a temperature at which the thermo-setting material will solidify.

Another advantage derived from maintaining this difference in temperature is that a slower rate of travel of the material through the nozzle can be employed as there is no danger of the material in the nozzle becoming overheated, i. e. reaching the temperature at which it solidifies, and this permits a nozzle orifice to be used having a larger cross-sectional diameter than certain of those of the prior art. The larger cross-sectional diameter of the nozzle permits more rapid and complete filling of the mold sprue, runners and cavities, and also materially increases the size of the piece or pieces which may be molded in one molding operation.

In molding systems applying relatively high temperatures to the thermo-setting material (either intentionally or incidentally in operation of the systems) prior to the injection of the material into the mold, the material in the nozzle, sprue and runners will set up prior to complete setting up of the material in the mold cavities and in some instances this occurs prior to the complete filling of the mold cavities. This results in imperfect moldings due to insufficient feeding of material through the sprues and runners to the molds to fill in shrinkages and to maintain the required pressure until setting up in the cavities has occurred. By maintaining a substantial difference in temperature between the material in the plasticizing chamber and nozzle, and the mold, the material in the nozzle, sprue and runners of the mold does not solidify throughout the cross-sectional area thereof until the material in the mold cavity has set. During this time pressure and material are applied to the mold through the fluid interiors of the sprue and runners. The relatively large cross-sectional area of the nozzle orifice permits continuous application of the requisite pressure for producing high quality molded parts.

Referring to Fig. 4, a sprue of a molded part is shown that was made in a mold by an injection process in which intense heat was applied to the thermo-setting material as it passed through the nozzle. In Fig. 5, a sprue of a molded part is shown which was made in the same mold as was used in molding the sprue shown in Fig. 4, but the molding process being in accordance with my present invention. It will be noted that the part S of the sprue in Fig. 4 is shrunken compared with the corresponding part of the sprue in Fig. 5. This difference was due to the inability to supply plastic material to the interior of the sprue, shown in Fig. 4, as the entire cross-sectional area of the material in the nozzle orifice solidified rapidly and thus additional material could not be fed to the sprue or mold cavities to fill in shrinkages. This condition indicates that the molded parts are insufficiently filled. On the other hand, the interior of the sprue shown in Fig. 5 solidified slowly relative to the outer portions so that material was transmitted therethrough and filled in all shrinkages in the sprues, runners and the molded pieces.

Referring to the sprues shown in Fig. 4, it will be noticed that material, indicated at 51, has adhered to the end of the sprue. This material had solidified in the nozzle or orifice of the injection apparatus due to over-heating. The sprue shown in Fig. 5 shows a clean break at 50, which is the end of the sprue adjacent to the nozzle of the injection apparatus embodying my invention. The clean break is a result of maintaining the temperature of the material in the nozzle below that at which it sets up by dissipating heat conducted from the mold. Thus, we have a sharp break or line of demarcation between the polymerized material in the sprue passage and the unpolymerized material in the relatively cool nozzle passage.

Referring more particularly to the apparatus 10, the plasticizing chamber includes a cylindrical body 11 in which a fluid cooled piston 12 is adapted to be reciprocated by any suitable mechanism, not shown, which mechanism may be an hydraulic motor, for example. The piston is fluted intermediate its ends for permitting escape of fine particles of material from between the piston and cylinder walls. Preferably, the piston 12 is cooled during operation of the apparatus, and for this purpose it is bored at 13 and a tube 14 extends into the bore. A cooling fluid, such as water, is introduced at the left-hand end of the bore 13 through a tube 14 and passage 15 and is led from the bore 13 through the tube 14 through a suitable hose connection not shown. Thermosetting material M is fed to the interior of the cylinder body 11 through an opening 16 from a hopper 17, which is mounted over the opening 16. When the piston 12 is reciprocated in the cylinder it moves to the left of the opening 16 and material drops into the cylinder and is moved toward the right by the piston into the bore of a cylindrical body 20, which is secured integrally with the member 11. The body 20 is provided with a cooling system consisting of an internal passage 21, through which a coolant, such as water, may be circulated. The passage 21 is in the form of a spiral and may be formed by cutting a spiral channel about the body 20 and a complementary channel on the interior of the sleeve 24, which is secured over the body 21 by threads, as shown. The water enters the connection 22, which is connected with one end of the passage 21 and circulates through the passage 21, then passing from the body 20 through a connection 23. Also, the body 20 is adapted to be heated by heating units indicated at 25, which heating units may be of any suitable electrical resistance material, however, or, it may be heated by any suitable means. In the present embodiment, however, they are resistance elements 26a embedded in ceramic material in the form of bands encircling the sleeve 24 and secured by bolts 26. The temperature of the member 20 is maintained approximately at a predetermined temperature, the particular temperature depending upon the type of thermo-setting material used, and I have shown a thermo-couple element 27, located in the body 20 so that it is responsive to the temperature of the body. The thermo-couple, in the present instance, is part of a system for controlling energization of the heater elements 26. The control system, however, is not shown, as such systems are known to those skilled in the art. Preferably, water is circulated through the body 20 when the body temperature approaches the maximum temperature. This may be controlled thermostatically by suitable means, not shown. In the present disclosure, the temperature of the body 20 is maintained at approximately 190° F. which is in the optimum temperature range for maintaining the material M plastic but substantially below its setting or polymerizing temperature.

A nozzle 30 is connected with the body 20 for discharging the plastic material into the sprue of a mold 40. The nozzle 30 includes a thin-walled neck 31 threaded at the outer end and a cup-shaped jacket 32 is threaded on the neck for directing a coolant thereabout. It is to be understood that this jacket could be welded or otherwise joined to the nozzle for the purpose stated. The orifice 35 through the neck 31 is shown tapering outwardly. The degree of taper may be more or less than that shown or the orifice may have a uniform diameter, or it may flare, but, preferably, the walls leading from the plasticizing chamber to the entrance of the orifice taper gradually for reducing friction of the material on the walls adjacent to the nozzle entrance to a minimum. An inlet connection 33 is connected in an opening formed in the jacket 32 so that a cooling fluid, in the present instance water, may be led to the jacket 32 and the water is discharged from the jacket through a connection 34. Preferably, a thermostatic control valve, indicated diagrammatically at 36, is placed in the discharge of the jacket 32 and is responsive to the temperature of the water about the nozzle for restricting passage of water from the jacket as the temperature falls toward the minimum temperature at which the material is plastic and increasing the flow when the temperature rises toward the setting up temperature of the material. It is essential to the successful practice of my inventions that the cooling device, in the present embodiment the jacket 32 and water circulating connections, be so designed that it can dissipate heat from the nozzle structure rapidly enough to prevent the material in the nozzle from setting. It will be noted that the jacket extends adjacent to the entrance to the nozzle from the chamber so that heat generated by the friction of the material passing into the nozzle passageway can be carried away. This heat would otherwise accumulate at the entrance to the nozzle and cause setting up of the material at this point.

The mold structure 40 which is formed of two parts 41 and 42 has a sprue bushing 42a in the part 41 for directing the thermo-setting material to the runners 43, formed in the chamber 42. The mold 40 is provided with six mold cavities 44, the cavities in this instance being illustrated as cubes, although they may be of any desired form, depending upon the shape of the article desired.

A sprue puller and knock-out rod 45 is provided, which is operated by suitable mechanism, after the mold part 42 has been separated from part 41 following a molding operation, for pulling the sprue from the sprue bushing 42a and then for knocking the sprue and its integral runners from the part 42. Also, knock-out rods may be provided for removing the molded pieces from the cavities 44, but since such knockout rods are well known they have not been shown. It is to be understood that for the sake of clearness, the various elements for supporting the mold and its parts and the mechanism for operating the sprue puller 45 are not shown, as they may be of conventional design.

The mold 40 is maintained at a temperature at which the thermo-setting material will be polymerized and this temperature is considerably above that at which the body 20 and the nozzle 31 are maintained. In the present instance, the temperature is maintained at approximately 420° F. The parts 41 and 42 have electrical resistance elements 46 embedded therein for heating the mold, although any other suitable heating means may be used, and the temperature of the mold is controlled by a suitable control mechanism for the heating elements, which system includes a thermo-couple 47 embedded in the part 42 of the mold. The thermo-couple 47 affects the control system in a manner well known in the art and therefore this control system is not shown.

In the operation of the apparatus 10, the thermo-setting material M is placed in the hopper 17 in a powdered or granulated condition and the piston 12 is operated to move the material into the bore of the body 20. The material is heated in the body 20 to a temperature at which it becomes plastic. The sprue bushing 42a of the mold 40 is maintained in contact with the nozzle and in alignment with the nozzle orifice. The part 42 of the mold is closed on part 41, as shown in the drawings, and the piston 12 is then actuated to force the plasticized material through the nozzle and through the sprue 42a, runners 43 and into the mold cavities 44. The relatively higher temperature of the mold structure causes polymerization of the thermo-setting material to take place, which polymerization will occur first adjacent to the walls of the mold. The interior of the sprue and runners remain fluid for an interval and provide transmission of material and pressure to the cavities until the material in the cavities has hardened. The piston acts upon the material during the polymerization of the material in the mold for maintaining the required pressure in the mold cavities and to fill in any shrinkages. After polymerization has taken place in the mold the force of piston 12 acting on the material is relieved and the mold part 42 is removed from the part 41, the latter being maintained in contact with the nozzle. It will be found that, due to maintaining the temperature in the nozzle below the setting up temperature of the material M, a clean break will be effected between the end of the sprue and the material in the nozzle. This is illustrated in Fig. 5 at 50 and has been alluded to hereinbefore. After the sprue, runners and cavities of the mold 40 have been emptied, another molding operation may be immediately performed in the same manner without the necessity of purging the injection apparatus of hardened material as has been customarily necessary in injection molding. It is apparent that successive molding operations can be performed rapidly because of the elimination of conditions causing hardening of the material in the injection apparatus.

Thus, I have provided a novel mechanism and molding method which overcome and eliminate numerous difficulties encountered in injection and continuous injection molding, especially of thermo-setting materials. By preventing the accumulation of heat in the nozzle and plasticizing chamber and by holding the nozzle and plasticizing chamber at an optimum temperature at all times, considerable saving of thermo-setting material is effected by the elimination of the usual purging operations, and more perfect molded articles are produced with greater speed than heretofore possible.

Although I have shown only one form of the embodiment of my invention it is to be understood that other forms might be adopted, all coming within the scope of the claims which follow.

I claim:

1. The method of continuously injecting a thermosetting material into a mold heated at least at the polymerizing temperature of said material which comprises pressure feeding said material into a chamber, heating said material in said chamber to a plasticizing temperature below the setting temperature and cooling said material to its plasticizing temperature whenever the temperature of the chamber rises above the plasticizing temperature of the material therein, pressure feeding said material from said chamber into and through an ejecting nozzle in the form of a substantially restricted passage whereby to further densify the material in its passage through said nozzle, removing heat from said nozzle whenever the temperature of the nozzle rises above the plasticizing temperature of said material whereby to remove excess accumulating heat caused by densification and friction of the material in the nozzle passage and by heat leakage thereto from the heated mold, and injecting said densified plasticized material at its plasticizing temperature from said nozzle into said heated, material-receiving mold.

2. In the method of continuously injecting a thermosetting material into a mold heated at least at the polymerizing temperature of said material, including the pressure feeding of said material into and through a chamber, the steps which comprise cooling said material to a plasticizing temperature below the setting temperature whenever the temperature of the chamber rises above the plasticizing temperature of the material therein, pressure feeding said material from said chamber into and through an ejecting nozzle in the form of a substantially restricted passage whereby to further densify the material in its passage through said nozzle, removing heat from said nozzle whenever the temperature of the nozzle rises above the plasticizing temperature of said material whereby to remove excess accumulating heat caused by densification and friction of the material in the nozzle passage and by heat leakage thereto from the heated mold, and injecting said densified plasticized material at its plasticizing temperature from said nozzle into said heated, material-receiving mold.

3. In an apparatus for the continuous molding of thermosetting material, including a heated, material-receiving mold maintained at least at the polymerizing temperature of said material, a chamber for receiving and densifying the thermosetting material and for heating said material up to its plasticizing temperature to transform said material to its thermally, non-setting state, a pressure plunger at one end of said chamber for forcing said material through said chamber and thereby densify said material, an ejecting nozzle structure in the form of a substantially restricted passage immediately associated with the other end of said chamber for further densifying the material in its passage from the chamber through the nozzle, heat-transferring means associated with said nozzle including a cooling passage disposed adjacent said nozzle passage and adapted to provide for the flow of a coolant fluid therethrough, a valve for regulating the rate of flow of the coolant fluid into said cooling passage and regulating means responsive to the temperature of the nozzle for controlling said valve whenever the temperature of the nozzle rises above the plasticizing temperature of said material whereby to remove excess accumulating heat caused by densification and friction of the material in the nozzle passage and excess heat caused by leakage thereto from the heated mold, said heated, material-receiving mold being in registration with the ejecting end of said nozzle passage for receiving the densified, plasticized material at its plasticizing temperature from the nozzle passage.

4. In an apparatus for the continuous molding of thermosetting material, including a heated, material-receiving mold maintained at least at the polymerizing temperature of said material, a chamber for receiving and densifying the thermosetting material and for heating said material up to its plasticizing temperature to transform said material to its thermally, non-setting state, heat-transferring means for cooling said chamber down to the plasticizing temperature of the material in said chamber whenever the temperature of said chamber rises above said plasticizing temperature, a pressure plunger at one end of said chamber for forcing said material through said chamber and thereby densify said material, an ejecting nozzle structure in the form of a substantially restricted passage immediately associated with the other end of said chamber for further densifying the material in its passage from the chamber through the nozzle, heat-transferring means associated with said nozzle including a cooling passage disposed adjacent said nozzle passage and adapted to provide for the flow of a coolant fluid therethrough, a valve for regulating the rate of flow of the coolant fluid into said cooling passage and regulating means responsive to the temperature of the nozzle for controlling said valve whenever the temperature of the nozzle rises above the plasticizing temperature of said material whereby to remove excess accumulating heat caused by densification and friction of the material in the nozzle passage and excess heat caused by leakage thereto from the heated mold, said heated, material-receiving mold being in registration with the ejecting end of said nozzle passage for receiving the densified, plasticized material at its plasticizing temperature from the nozzle passage.

5. The combination set forth in claim 3, wherein the cooling passage is in the form of an annular jacket disposed around said nozzle passage.

GEORGE J. KOVACS.

REFERENCES CITED

The following references are of record in the file of this patent:

UNITED STATES PATENTS

| Number | Name | Date |
|---|---|---|
| 1,993,942 | Novotny | Mar. 12, 1935 |
| 2,090,489 | Sommerfeld | Aug. 17, 1937 |
| 2,338,691 | Tucker | Jan. 4, 1944 |
| 2,344,176 | Shaw | Mar. 14, 1944 |